United States Patent
Yun

(10) Patent No.: US 7,456,917 B2
(45) Date of Patent: Nov. 25, 2008

(54) DISPLAY PANEL AND DISPLAY DEVICE HAVING THE SAME

(75) Inventor: Young-Nam Yun, Gunpo-si (KR)

(73) Assignee: Samsung Electronics Co., Ltd. (KR)

( * ) Notice: Subject to any disclaimer, the term of this patent is extended or adjusted under 35 U.S.C. 154(b) by 542 days.

(21) Appl. No.: 11/254,083

(22) Filed: Oct. 19, 2005

(65) Prior Publication Data

US 2006/0103787 A1    May 18, 2006

(30) Foreign Application Priority Data

Nov. 12, 2004    (KR) .................. 10-2004-0092513

(51) Int. Cl.
*G02F 1/1335*    (2006.01)
(52) U.S. Cl. .................. 349/114; 349/106; 349/113
(58) Field of Classification Search ......... 349/113–114, 349/106
See application file for complete search history.

(56) References Cited

U.S. PATENT DOCUMENTS

| | | | | |
|---|---|---|---|---|
| 5,767,926 A * | 6/1998 | Kim et al. | .................. | 349/38 |
| 2002/0036726 A1 | 3/2002 | Choo | .................. | 349/43 |
| 2004/0046907 A1 | 3/2004 | Ham et al. | .................. | 349/96 |
| 2004/0061812 A1 | 4/2004 | Maeda | .................. | 349/65 |
| 2004/0085498 A1 | 5/2004 | Chang | .................. | 349/114 |

FOREIGN PATENT DOCUMENTS

JP    04-090513    3/1992

OTHER PUBLICATIONS

European Search Report for Application No. 05023714.8-2205; Dated Mar. 6, 2006.

* cited by examiner

*Primary Examiner*—David C. Nelms
*Assistant Examiner*—Phu Vu
(74) *Attorney, Agent, or Firm*—Cantor Colburn LLP

(57) ABSTRACT

A display panel includes a liquid crystal layer, an array substrate and a color filter substrate. The array substrate has a plurality of data lines, a plurality of gate lines and a plurality of pixel regions. The electrode for a storage capacitor is formed on each of the pixel regions. The color filter substrate is combined with the array substrate to receive the liquid crystal layer therebetween. The color filter substrate includes a first region where a color filter is formed and a second region where an opening is formed. The opening corresponds to the electrode for the storage capacitor. Thus, light reflected by the electrode for the storage capacitor exits the display panel through the opening, thereby enhancing an optical reflectivity of each pixel region.

27 Claims, 11 Drawing Sheets

DISPLAY PANEL AND DISPLAY DEVICE HAVING THE SAME

CROSS-REFERENCE TO RELATED APPLICATIONS

This application claims for priority to Korean Patent Application No. 2004-92513 filed on Nov. 12, 2004 and all the benefits accruing therefrom under 35 U.S.C. §119, and the contents of which in its entirety are herein incorporated by reference.

BACKGROUND OF THE INVENTION

1. Field of the Invention

The present invention relates to a display panel and a display device having the display panel. More particularly, the present invention relates to a display panel with an improved optical reflectivity and a display device having the display panel.

2. Description of the Related Art

Generally, a liquid crystal display (LCD) device includes a transmissive type LCD and a transmissive-reflective type LCD. The transmissive type LCD displays an image by transmitting light internally provided. The transmissive-reflective type LCD displays an image by transmitting light internally provided or by reflecting light externally provided.

For example, the transmissive-reflective type LCD is operated in a reflective mode or a transmissive mode using a mechanical structure and an optical condition similar to the transmissive type LCD. The above-mentioned transmissive-reflective type LCD has a high color reproducibility in the reflective mode compared with the transmissive mode. However, the transmissive-reflective type LCD has a low optical reflectivity, thereby deteriorating a display quality thereof.

BRIEF SUMMARY OF THE INVENTION

The present invention obviates the above problems and thus the present invention provides a display panel capable of improving an optical reflectivity thereof.

The present invention also provides a display device having the above-mentioned display panel.

In one aspect of the present invention, a display panel includes a liquid crystal layer, an array substrate and a color filter substrate. The array substrate has a plurality of data lines, a plurality of gate lines and a plurality of pixel regions. The electrode for a storage capacitor is formed on each of the pixel regions. The color filter substrate is combined with the array substrate to receive the liquid crystal layer therebetween. The color filter substrate includes a first region where a color filter is formed and a second region where an opening is formed. The opening corresponds to the electrode for the storage capacitor.

The electrode for the storage capacitor preferably has a size corresponding to about 10% to about 20% of a size of each pixel region.

The array substrate may further include a reflective electrode corresponding to the electrode for the storage capacitor. The reflective electrode may have a substantially same size as the electrode for the storage capacitor.

The reflective electrode may correspond to a same layer as the data lines, or a metal pattern formed on a pixel electrode.

The liquid crystal layer may have a cell gap of $\lambda/2$, and includes a twisted nematic mode. Here, $\lambda$ represents a wavelength of specified achromatic light.

Preferably, the opening has a size corresponding to about 80% to about 120% of a size of the electrode for the storage capacitor.

In another aspect of the present invention, a display device includes an LCD panel and a backlight assembly. The LCD panel includes a liquid crystal layer, an array substrate having an electrode for a storage capacitor formed thereon to reflect a first light, and a color filter substrate having a light hole formed thereon. The light hole corresponds to the electrode for the storage capacitor. The backlight assembly irradiates a second light into the LCD panel, and reflects the first light to the LCD panel.

The array substrate may further include a reflective electrode corresponding to the electrode for the storage capacitor and reflecting the first light.

The array substrate may further include a plurality of data lines and a pixel electrode. The reflective electrode may correspond to a same layer as the data lines, or a metal pattern formed on the pixel electrode.

Preferably, the display device further includes a first polarizing film, a diffusion layer and a second polarizing film. The first polarizing film is disposed beneath the LCD panel to polarize incident light in a first polarized state. The diffusion layer is disposed between the LCD panel and the first polarizing film to diffuse the incident light. The second polarizing film is disposed on the LCD panel to polarize the incident light in a second polarized state.

Preferably, the diffusion layer includes synthetic resin having a scattering material, and has a haze no less than about 60%.

The display device optionally may include a transflective film disposed between the backlight assembly and the first polarizing film to selectively reflect or transmit the incident light. The transflective film has a substantially same transmission axis as a first polarization axis of the first polarizing film. Preferably, the transflective film is integrally formed with the first polarizing film.

According to the above, an electrode for a storage capacitor is used for a reflective electrode. Alternatively, the reflective electrode is formed on the electrode for the storage capacitor, and the light hole is formed on a portion corresponding thereto. Thus, an optical reflectivity of each pixel region may be enhanced by an amount of light that is reflected by the reflective electrode and the light hole.

BRIEF DESCRIPTION OF THE DRAWINGS

The above and other features and advantage points of the present invention will become more apparent by describing in detailed exemplary embodiments thereof with reference to the accompanying drawings, in which.

DETAILED DESCRIPTION OF THE INVENTION

Figure 1:
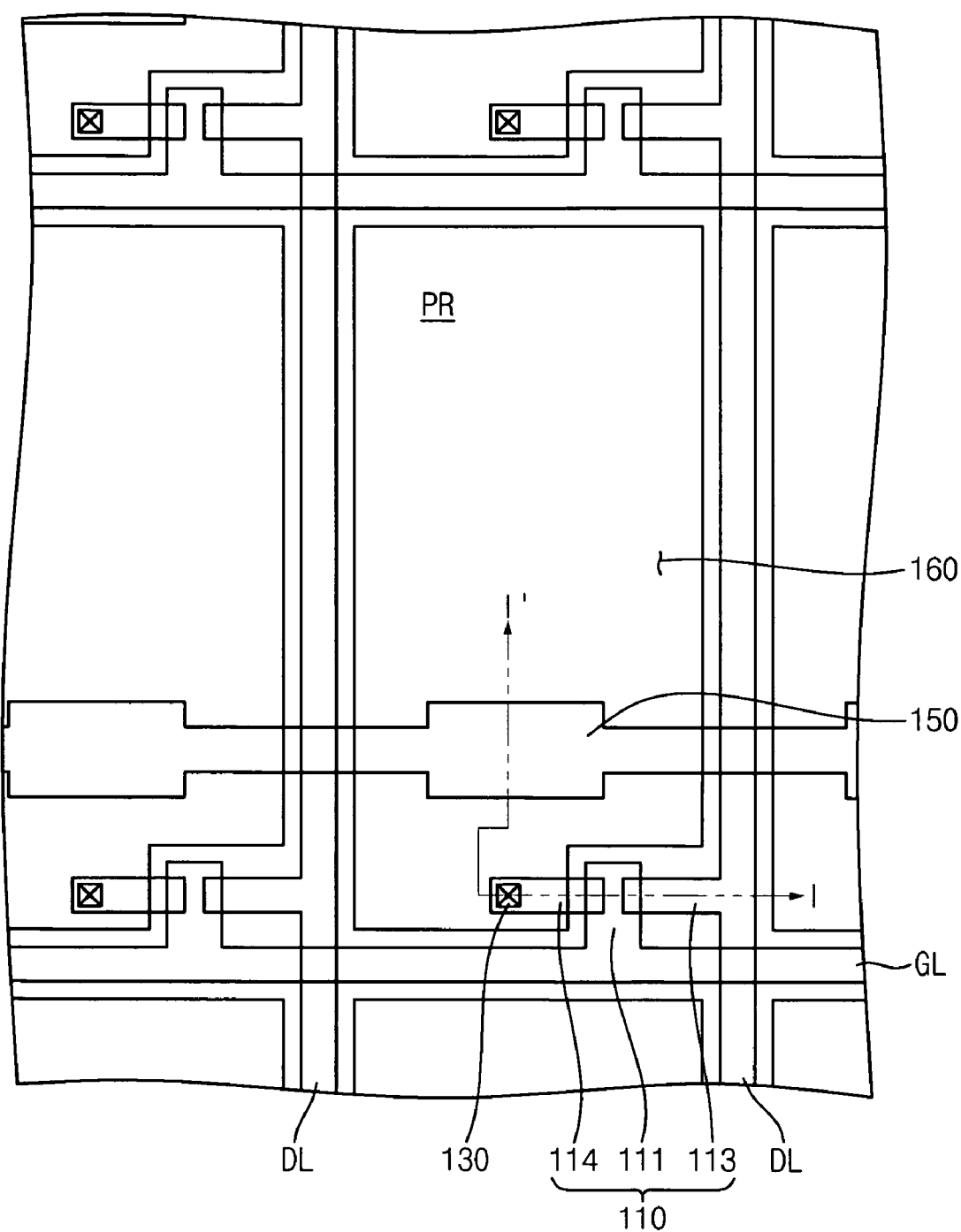
FIG. 1 is a plan view illustrating an exemplary embodiment of an array substrate in accordance with the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like reference numerals refer to similar or identical elements throughout.

In the drawings, the thickness of the layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

FIG. 1 is a plan view illustrating an exemplary embodiment of an array substrate in accordance with the present invention.

Referring to FIG. 1, an array substrate 100 includes a plurality of gate lines GL arranged in a first direction, a plurality of data (or source) lines DL arranged in a second direction intersecting the first direction, and a plurality of pixel regions PR defined by the gate lines GL and data lines DL.

A switching element 110, a storage capacitor and a pixel electrode 160 are formed on each of the pixel regions PR. In an exemplary embodiment, the switching element 110 is a thin film transistor (TFT). The storage capacitor may be electrically connected to the switching element 110. The pixel electrode 160 corresponds to an electrode of a liquid crystal capacitor.

The switching element 110 includes a gate electrode 111 electrically connected to the gate lines GL, a source electrode 113 electrically connected to the data lines DL, a drain electrode 114 electrically connected to the pixel electrode 160 via a contact hole 130. A semiconductor layer (not shown) is formed between the gate electrode 111, and the source and drain electrodes 113 and 114.

The storage capacitor includes a first electrode 150 and the pixel electrode 160. The first electrode 150 corresponds to a same metal layer as the gate lines GL, and reflects light that is incident thereonto. The first electrode 150 has a size corresponding to about 10% to about 20% of a size of each pixel region PR. When the switching element 110 is in a turn-off state, the storage capacitor maintains a voltage charged in the liquid crystal capacitor for one frame.

In an exemplary embodiment, each of the gate lines GL and the data lines DL, may be formed to have a single metal layered structure. I alternative exemplary embodiments, each of the gate lines GL and the data lines DL may be formed to have a multiple metal layered structure. The metal layer may be made of materials including, but not limited to, aluminum-group metals such as aluminum (Al) and aluminum alloy, silver-group metals such as silver (Ag) and silver alloy, copper-group metals such as copper (Cu) and copper alloy, molybdenum-group metals such as molybdenum (Mo) and molybdenum alloy, chromium (Cr), tantalum (Ta), titanium (Ti), etc.

Figure 2:
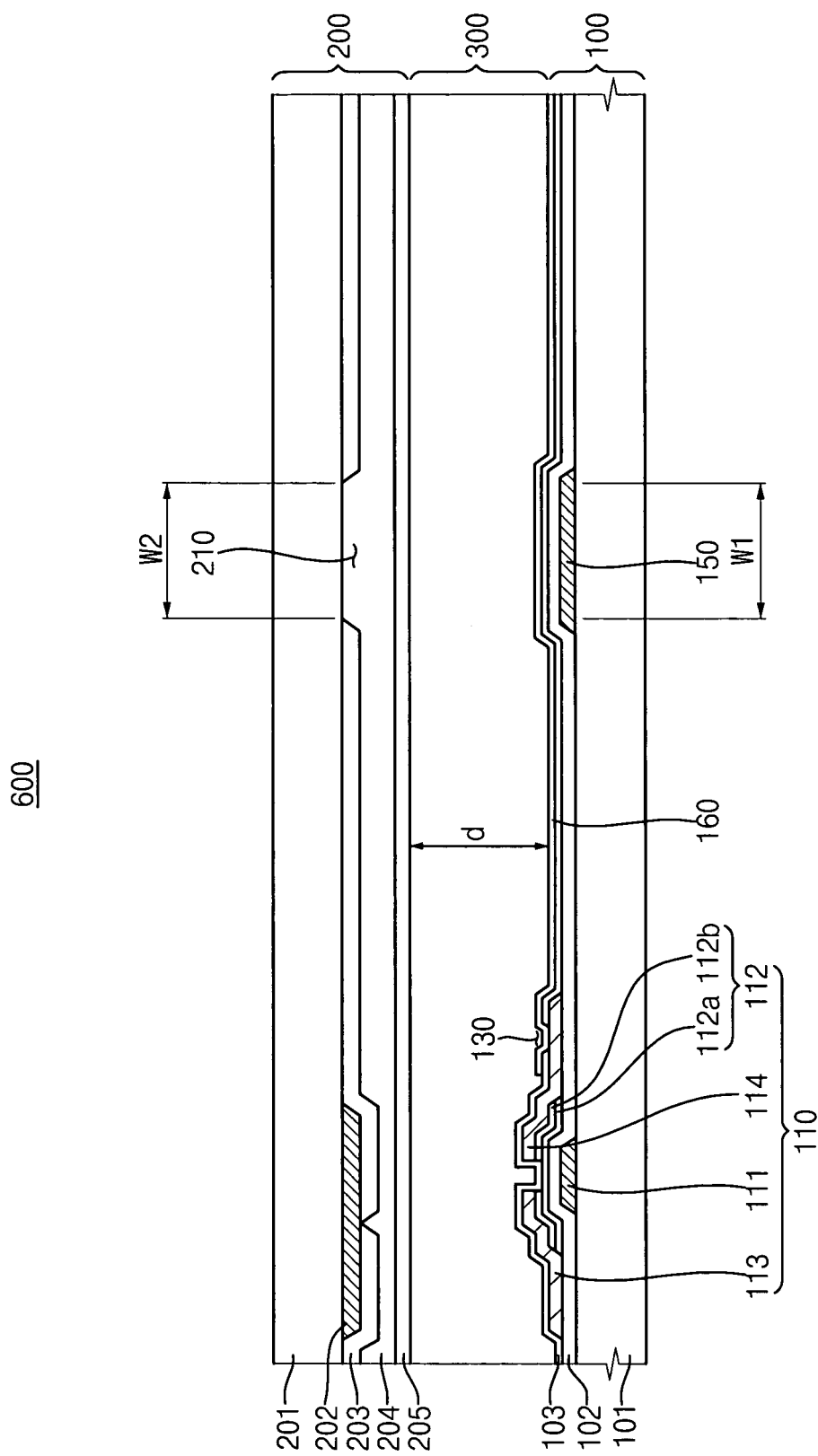
FIG. 2 is a cross-sectional view taken along line I-I' in FIG. 1.

FIG. 2 is a cross-sectional view taken along line I-I' in FIG. 1.

Referring to FIG. 2, a display panel 600 includes the array substrate 100 shown in FIG. 1, a color filter substrate 200 and a liquid crystal layer 300.

The array substrate 100 includes a transparent substrate 101, the switching element 110, the pixel electrode 160 for the liquid crystal capacitor, and the first electrode 150 for the storage capacitor. The switching element 110 includes a gate electrode 111, a semiconductor layer 112, a source electrode 113 and a drain electrode 114. The gate electrode 111 is formed on the transparent substrate 101, and a gate insulation layer 102 is formed on the gate electrode 111. The semiconductor layer 112 is formed on a portion of the gate insulation layer 102 corresponding to the gate electrode 111. The semiconductor layer 112 includes an active layer 112a formed on the gate insulation layer 102, and an ohmic contact layer 112b formed on the active layer 112a. The active layer 112a and the ohmic contact layer 112b may be made of materials including, but not limited to, an amorphous silicon layer and an n+ amorphous silicon layer. The source and drain electrodes 113 and 114 are formed on the semiconductor layer 112, and spaced apart from each other. The source and drain electrodes 113 and 114 are partially overlapped with the semiconductor layer 112, respectively. A passivation layer 103 is formed on the source and drain electrodes 113 and 114.

The pixel electrode 160 for the liquid crystal capacitor is electrically connected to the drain electrode 114 through a contact hole 130. The contact hole 130 may be formed by partially removing the passivation layer 103 formed on the drain electrode 114.

The first electrode 150 for the storage capacitor may be made of the same metal layer as the gate electrode 111. The gate insulation layer 102 is formed on the first electrode 150, and the pixel electrode 160 is formed on the gate insulation layer 102. The pixel electrode 160 corresponds to a second electrode for the storage capacitor. The first electrode 150 reflects light that is incident thereonto. The first electrode 150 may have a size corresponding to about 10% to about 20% of a size of each pixel region PR in FIG. 1.

In an exemplary embodiment, each of the gate, source and drain electrodes 111, 113 and 114 may be formed as a single metal layer. In an alternative exemplary embodiment, each of the gate, source and drain electrodes 111, 113 and 114 may be formed as multiple metal layers. The metal layer may be made of materials, including but not limited to, aluminum-group metals such as aluminum (Al) and aluminum alloy, silver-group metals such as silver (Ag) and silver alloy, copper-group metals such as copper (Cu) and copper alloy, molybdenum-group metals such as molybdenum (Mo) and molybdenum alloy, chromium (Cr), tantalum (Ta), titanium (Ti), etc. Although not shown in FIG. 2, gate lines correspond to a same metal layer as the gate electrode 111 and the first electrode 150 for the storage capacitor. In addition, data lines correspond to the same metal layer as the source and drain electrodes 113 and 114.

The color filter substrate 200 includes a transparent substrate 201. The color filter substrate 200 also includes an intercepting layer 202, a pixel layer 203, a protective layer 204 and a common electrode 205 successively formed on the transparent substrate 201. The intercepting layer 202 intercepts light, and defines a first portion of the pixel region PR in FIG. 1 corresponding to the pixel electrode 160.

The pixel layer 203 includes red, green and blue color filter patterns. Each of the color filter patterns is formed on the first portion defined by the intercepting layer 202. A light hole 210 is formed through the pixel layer 203. In another exemplary embodiment, a portion of the color filter pattern that corresponds to the first electrode 150 for the storage capacitor is removed to form the light hole 210.

Accordingly, light that is incident into the display panel 600 is reflected by the first electrode 150 for the storage capacitor to exit the display panel 600 through the light hole 210, so that an optical reflectivity thereof may be enhanced. The light hole 210 may have a size W2 corresponding to about 80% to about 120% of a size W1 of the first electrode 150.

The protective layer 204 is formed on the intercepting layer 202 and the pixel layer 203 to planarize and protect the intercepting layer 202 and the pixel layer 203. The common electrode 205 disposed on the protective layer 204 may be made of any suitable material that is transparent and conductive. The common electrode 205 to which a common voltage is applied corresponds to a second electrode of the liquid crystal capacitor.

Liquid crystal molecules of the liquid crystal layer 300 are capable of being rearranged by a voltage difference between a pixel electrode 160 of the array substrate 100 and the common electrode 205 of the color filter substrate 200. When electric fields are applied to the liquid crystal layer 300, an arrangement of liquid crystal molecules of the liquid crystal layer 300 is altered to change optical transmissivity, thereby displaying an image. The liquid crystal layer 300 is comprised of about 90 degrees twisted nematic (TN) liquid crystal. The liquid crystal layer 300 has a cell gap 'd' of $\lambda/2$, where $\lambda$ represents a wavelength of specified achromatic light. In an exemplary embodiment, the $\lambda/2$ is in a range of about 0.35 μm to about 0.45 μm.

Figure 3:
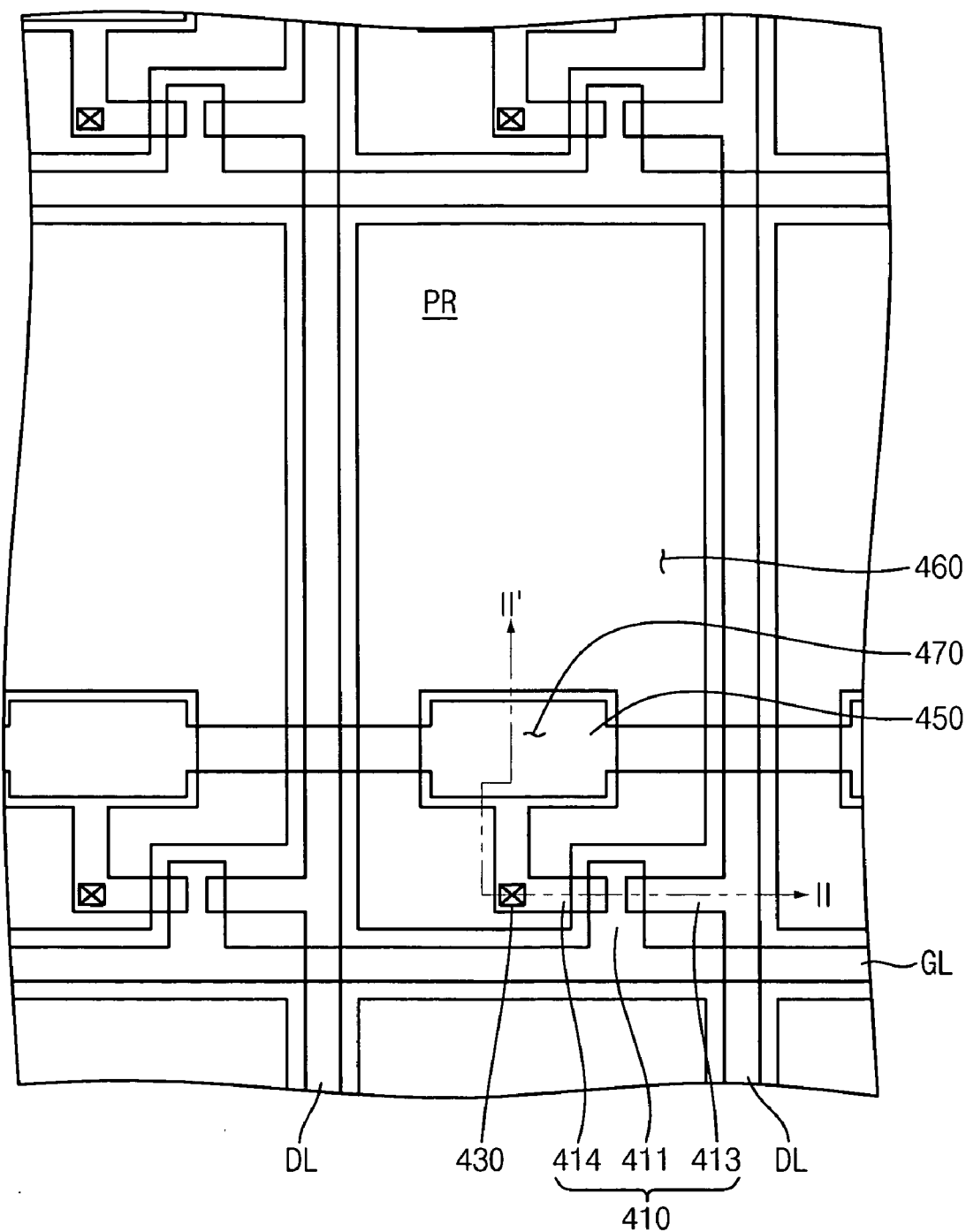
FIG. 3 is a plan view illustrating another exemplary embodiment of an array substrate in accordance with the present invention.

FIG. 3 is a plan view illustrating another exemplary embodiment of an array substrate in accordance with the present invention.

Referring to FIG. 3, an array substrate 400 includes a plurality of gate lines GL arranged in a first direction, a plurality of data (or source) lines DL arranged in a second direction intersecting the first direction, and a plurality of pixel regions PR defined by the gate lines GL and data lines DL.

A switching element 410, a storage capacitor, a pixel electrode 460 and a reflective electrode 470 are formed on each of the pixel regions PR. For example, the switching element 410 is a thin film transistor (TFT) and the storage capacitor is electrically connected to the switching element 410. The pixel electrode 460 corresponds to one of electrodes of a liquid crystal capacitor. The reflective electrode 470 corresponds to a same metal layer as the data lines DL.

The switching element 410 includes a gate electrode 411 electrically connected to the gate lines GL, a source electrode 413 electrically connected to the data lines DL, a drain electrode 414 electrically connected to the pixel electrode 460 via a contact hole 430. A semiconductor layer (not shown) is formed between the gate electrode 411, and the source and drain electrodes 413 and 414.

The storage capacitor includes a first storage capacitor and a second storage capacitor. The first storage capacitor includes a first electrode 450 and the reflective electrode 470. The second storage capacitor includes the reflective electrode 470 and the pixel electrode 460. The first electrode 450 corresponds to a same metal layer as the gate lines GL and has a size corresponding to about 10% to about 20% of a size of each pixel region PR. When the switching element 410 is in a turn-off state, the storage capacitor maintains a voltage charged in the liquid crystal capacitor for one frame.

The reflective electrode 470 is formed on a portion of the pixel region PR corresponding to the first electrode 450 of the storage capacitor. The reflective electrode 470 has a substantially the same size as the first electrode 450. The reflective electrode 470 may be extended from the drain electrode 414. Alternatively, the reflective electrode 470 may be correspondingly patterned to the first electrode 450. The reflective electrode 470 reflects light incident thereonto. A light hole is formed on a color filter substrate corresponding to the reflective electrode 470. Thus, the light reflected by the reflective electrode 470 exits through the light hole, thereby improving an optical reflectivity thereof.

Figure 4:
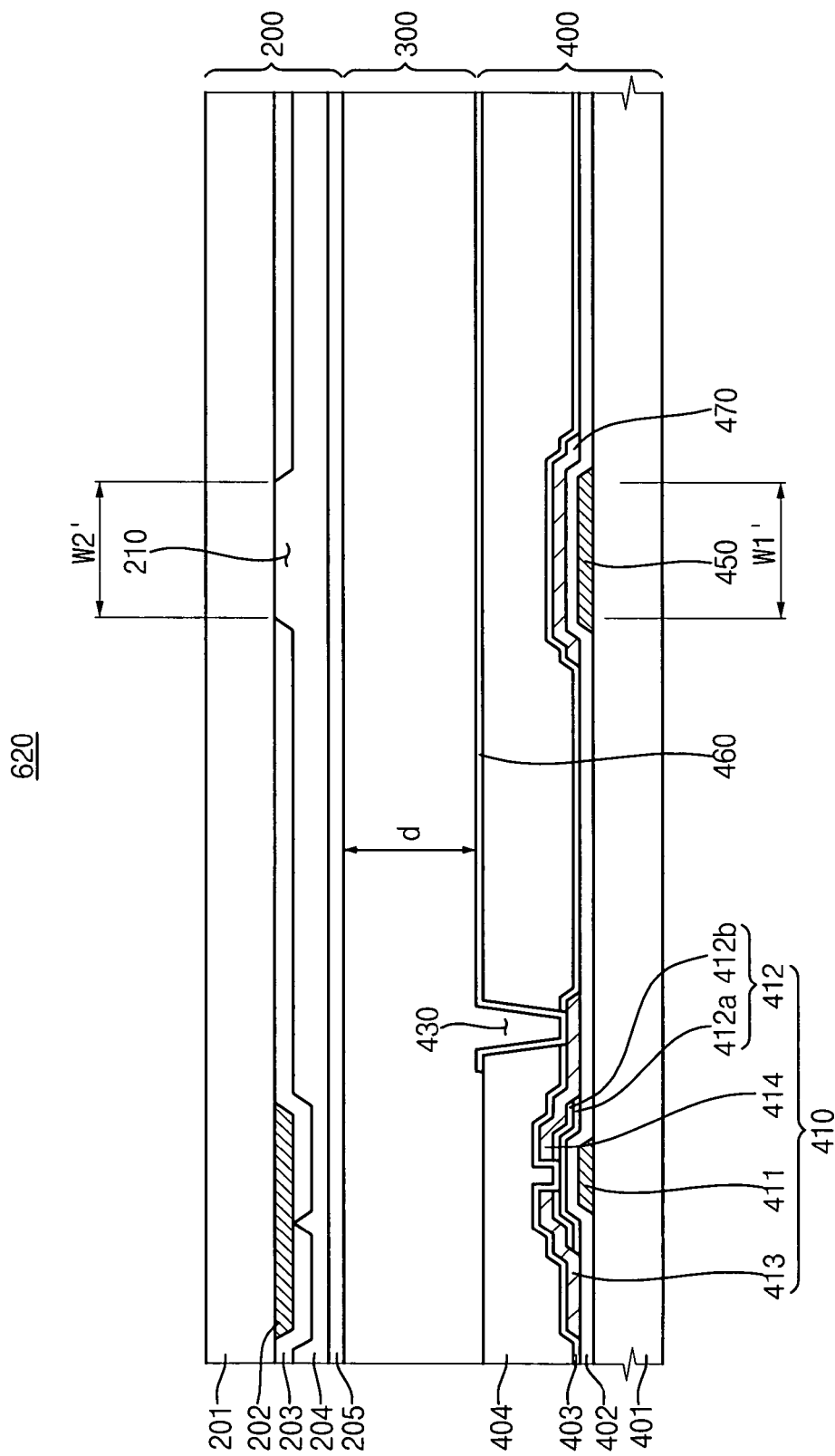
FIG. 4 is a cross-sectional view taken along line II-II' in FIG. 3.

FIG. 4 is a cross-sectional view taken along line II-II' in FIG. 3.

Referring to FIG. 4, a display panel 620 includes the array substrate 400 shown in FIG. 3, a color filter substrate 200 and a liquid crystal layer 300.

The array substrate 400 includes a transparent substrate 401, the switching element 410, the first electrode 450 for the storage capacitor, the pixel electrode 460 for the liquid crystal capacitor and the reflective electrode 470.

The switching element 410 includes a gate electrode 411, a semiconductor layer 412, a source electrode 413 and a drain electrode 414. The gate electrode 411 is formed on the transparent substrate 401, and a gate insulation layer 402 is formed on the gate electrode 411. The semiconductor layer 412 is formed on a portion of the gate insulation layer 402 corresponding to the gate electrode 411. The semiconductor layer 412 includes an active layer 412a formed on the gate insulation layer 402, and an ohmic contact layer 412b formed on the active layer 412a. The active layer 412a and the ohmic contact layer 412b may be made of materials including, but not limited to, an amorphous silicon layer and an n+ amorphous silicon layer. The source and drain electrodes 413 and 414 are formed on the semiconductor layer 412, and spaced apart from each other. The source and drain electrodes 413 and 414 may be partially overlapped with the semiconductor layer 412. A passivation layer 403 and an insulation layer 404 are formed on the source and drain electrodes 413 and 414. Alternatively, the insulation layer 404 may not be formed.

In an exemplary embodiment, the first electrode 450 corresponds to a same metal layer as the gate electrode 411 and prevents internal light from leaking from a rear face of the array substrate 400. The first electrode 450 has a size corresponding to about 10% to about 20% of a size of each pixel region PR in FIG. 3. The gate insulation layer 402 is formed on the first electrode 450. The storage capacitor includes a first storage capacitor defined by the first electrode 450 and the reflective electrode 470, and a second storage capacitor defined by the reflective electrode 470 and the pixel electrode 460.

The pixel electrode 460 for the liquid crystal capacitor is formed on the insulation layer 404. The pixel electrode 460 is electrically connected to the drain electrode 414 through a contact hole 430. The contact hole 430 may be formed by partially removing the passivation layer 403 and the insulation layer 404 that are formed over the drain electrode 414.

The reflective electrode 470 corresponds to a same metal layer as the source and drain electrodes 413 and 414. The reflective electrode 470 corresponds to the first electrode 450 for the storage capacitor and may have a substantially same size as the first electrode 450. The reflective electrode 470 reflects light that is incident thereonto.

In an exemplary embodiment, each of the gate, source and drain electrodes 411, 413 and 414 may be formed as a single metal layer. In an alternative exemplary embodiment, each of the gate, source and drain electrodes 411, 413 and 414 may be formed as multiple metal layers. The metal layer may be made of materials including, but not limited to, aluminum-group metals such as aluminum (Al) and aluminum alloy, silver-group metals such as silver (Ag) and silver alloy, copper-group metals such as copper (Cu) and copper alloy, molybdenum-group metals such as molybdenum (Mo) and molybdenum alloy, chromium (Cr), tantalum (Ta), titanium (Ti), etc. Although not shown in FIG. 4, gate lines may correspond to a same metal layer as the gate electrode 411 and the first electrode 450 for the storage capacitor. In addition, data lines correspond to a same metal layer as the source and drain electrodes 413 and 414.

The color filter substrate 200 includes a transparent substrate 201. The color filter substrate 200 also includes an intercepting layer 202, a pixel layer 203, a protective layer 204 and a common electrode 205 successively formed on the transparent substrate 201. The intercepting layer 202 intercepts light, and defines a first portion of the pixel region PR in FIG. 3 corresponding to the pixel electrode 460.

The pixel layer 203 includes red, green and blue color filter patterns. Each of the color filter patterns is formed on the first portion defined by the intercepting layer 202. A light hole 210 is formed through the pixel layer 203. In an exemplary embodiment, a portion of the color filter pattern that corresponds to the reflective electrode 470 is removed to form the light hole 210.

Accordingly, light that is incident into the display panel 620 is reflected by the reflective electrode 470 for the storage capacitor to exit the display panel 620 through the light hole 210, so that an optical reflectivity thereof may be enhanced. The light hole 210, for example, has a size W2' corresponding to about 80% to about 120% of a size W1' of the reflective electrode 470. The size W1' is substantially the same as a size of the first electrode 450.

The protective layer 204 is formed on the intercepting layer 202 and the pixel layer 203 to planarize and protect the intercepting layer 202 and the pixel layer 203. The common electrode 205 may be made of any suitable material that is transparent and conductive. The common electrode 205 to which a common voltage is applied corresponds to a second electrode of the liquid crystal capacitor.

Liquid crystal molecules of the liquid crystal layer 300 are rearrangeable by a voltage difference between a pixel electrode 460 of the array substrate 400 and a common electrode 205 of the color filter substrate 200. When electric fields are applied to the liquid crystal layer 300, an arrangement of liquid crystal molecules of the liquid crystal layer 300 is altered to change optical transmissivity, thereby displaying an image. The liquid crystal layer 300 may be comprised of about 90 degrees twisted nematic (TN) liquid crystal. The liquid crystal layer 300 has a cell gap 'd' of $\lambda/2$, where $\lambda$ represents a wavelength of specified achromatic light. In an exemplary embodiment, the $\lambda/2$ is in a range of about 0.35 μm to about 0.45 μm.

Figure 5:
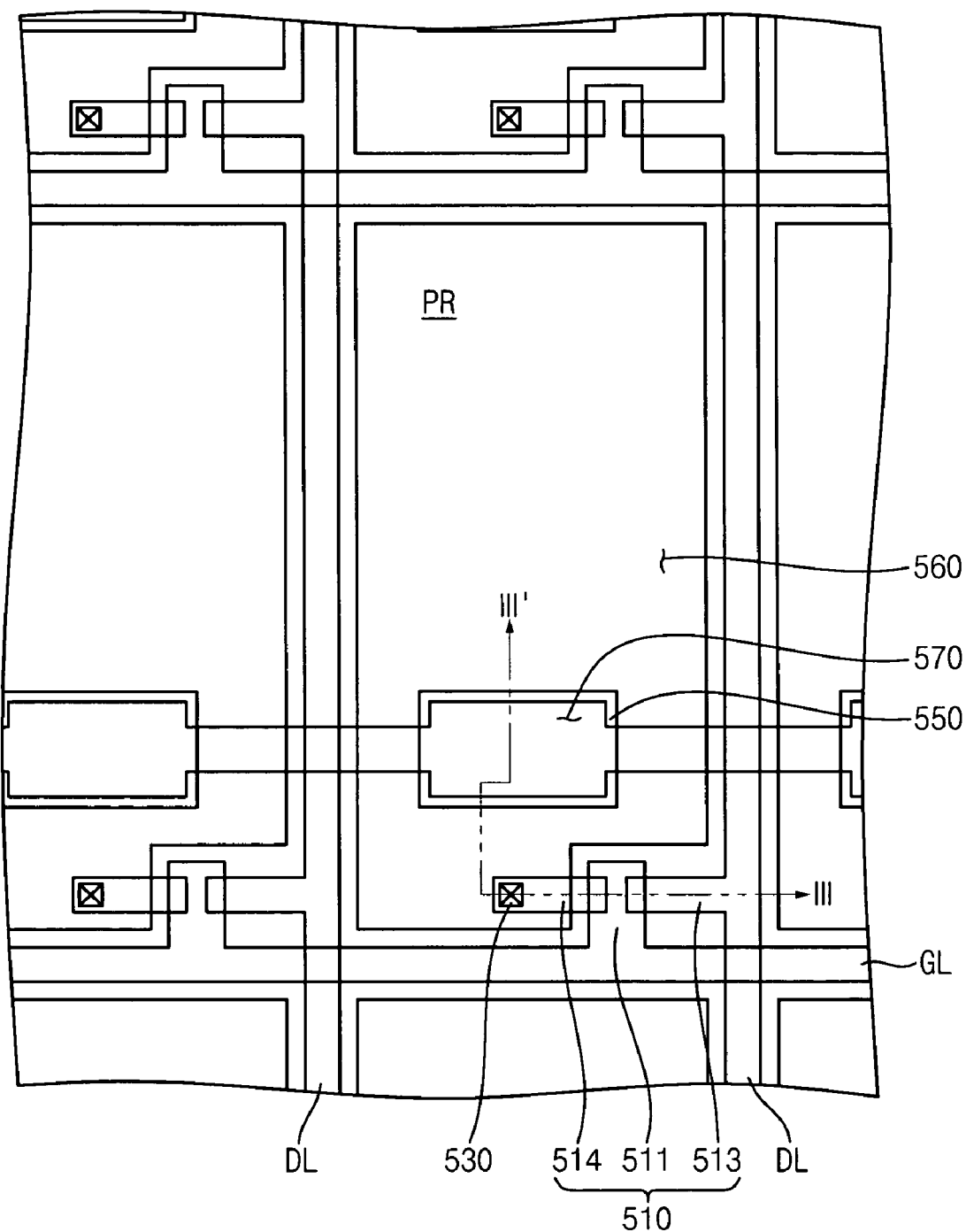
FIG. 5 is a plan view illustrating still another exemplary embodiment of an array substrate in accordance with the present invention.

FIG. 5 is a plan view illustrating still another exemplary embodiment of an array substrate in accordance with the present invention.

Referring to FIG. 5, an array substrate 500 includes a plurality of gate lines GL arranged in a first direction, a plurality of data lines DL arranged in a second direction intersecting the gate line GL, and a plurality of pixel regions PR defined by the gate lines GL and data lines DL.

A switching element 510, a storage capacitor, a pixel electrode 560 and a reflective electrode 570 are formed on each of the pixel regions PR. In an exemplary embodiment, the switching element 510 is a thin film transistor (TFT) and the storage capacitor is electrically connected to the switching element 510. The pixel electrode 560 corresponds to one of electrodes of a liquid crystal capacitor. The reflective electrode 570 is formed on the pixel electrode 560.

The switching element 510 includes a gate electrode 511 electrically connected to the gate lines GL, a source electrode 513 electrically connected to the data lines DL, and a drain electrode 514 electrically connected to the pixel electrode 560 via a contact hole 530. A semiconductor layer (not shown) is formed between the gate electrode 511, and the source and drain electrodes 513 and 514.

The storage capacitor includes a first electrode 550 and the pixel electrode 560. The first electrode 550 corresponds to a same metal layer as the gate lines GL and may have a size corresponding to about 10% to about 20% of a size of each pixel region PR. When the switching element 510 is in a turn-off state, the storage capacitor maintains a voltage charged in the liquid crystal capacitor for one frame.

The reflective electrode 570 may be formed on the pixel electrode 560 corresponding to a size and a position of the first electrode 550 of the storage capacitor. The reflective electrode 570 may be substantially the same size as the first electrode 550 and may extend from the drain electrode 514. Alternatively, the reflective electrode 570 may be correspondingly patterned to the first electrode 550. The reflective electrode 570 reflects light incident thereonto. A light hole is formed on the color filter substrate corresponding to the reflective electrode 570. Thus, the light reflected by the reflective electrode 570 exits through the light hole, thereby improving an optical reflectivity thereof.

Figure 6:
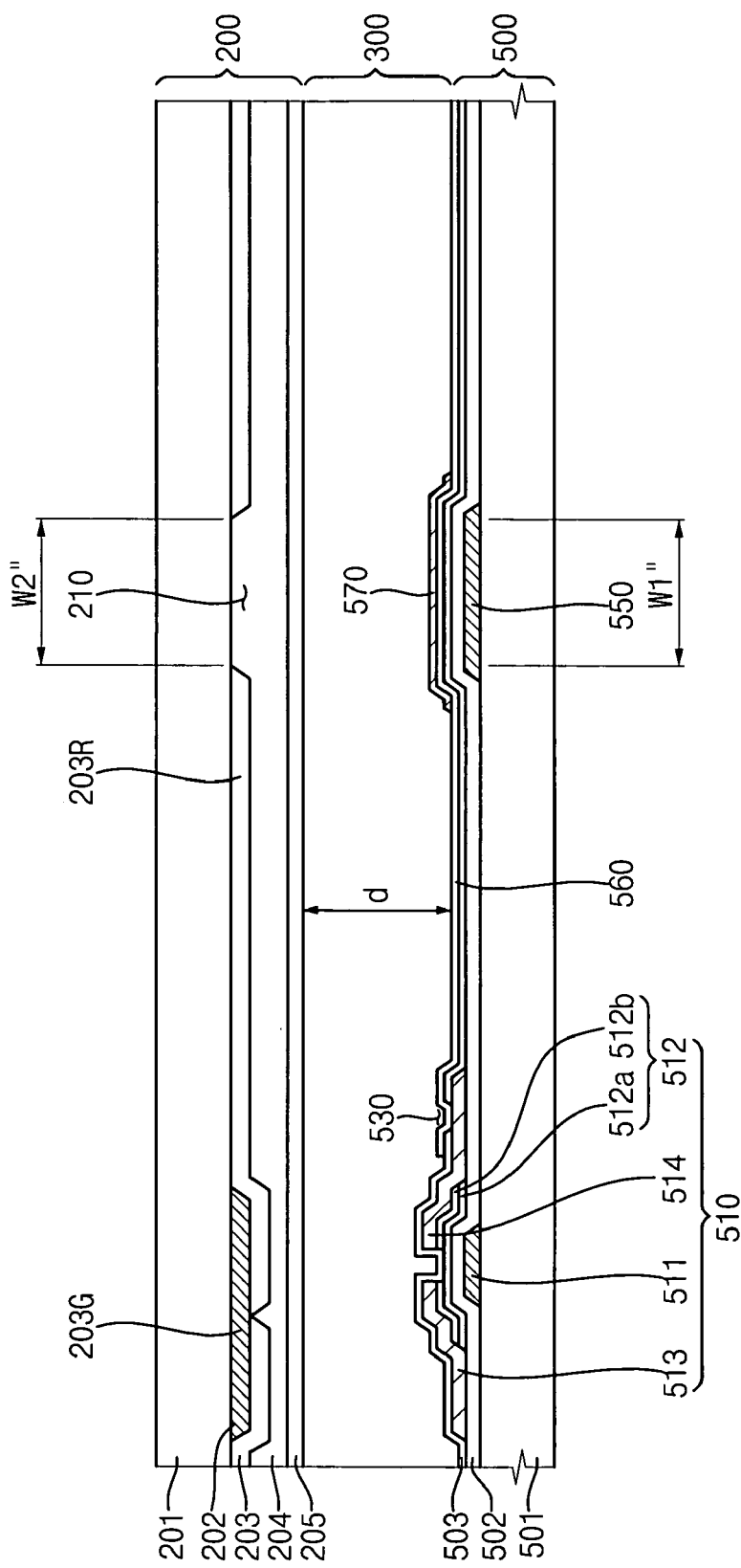
FIG. 6 is a cross-sectional view taken along line III-III' in FIG. 5.

FIG. 6 is a cross-sectional view taken along line III-III' in FIG. 5.

Referring to FIG. 6, a display panel 640 includes the array substrate 500 shown in FIG. 5, a color filter substrate 200 and a liquid crystal layer 300.

The array substrate 500 includes a transparent substrate 501, the switching element 510, the first electrode 550 for the storage capacitor, the pixel electrode 560 for the liquid crystal capacitor and the reflective electrode 570.

The switching element 510 includes a gate electrode 511, a semiconductor layer 512, a source electrode 513 and a drain electrode 514. The gate electrode 511 is formed on the transparent substrate 501, and a gate insulation layer 502 is formed on the gate electrode 511. The semiconductor layer 512 is formed on a portion of the gate insulation layer 502 corresponding to the gate electrode 511. The semiconductor layer 512 includes an active layer 512a formed on the gate insulation layer 502, and an ohmic contact layer 512b formed on the active layer 512a. The active layer 512a and the ohmic contact layer 512b may be made of materials including, but not limited to, an amorphous silicon layer and an n+ amorphous silicon layer. The source and drain electrodes 513 and 514 are formed on the semiconductor layer 512, and spaced apart from each other. The source and drain electrodes 513 and 514 may partially overlap with the semiconductor layer 512. A passivation layer 503 is formed on the source and drain electrodes 513 and 514. Alternatively, an insulation layer (not shown) may be formed on the passivation layer 503.

In an exemplary embodiment, the first electrode 550 corresponds to a same metal layer as the gate electrode 511. The first electrode 550 may have a size corresponding to about 10% to about 20% of a size of each pixel region PR in FIG. 5. The gate insulation layer 502, the passivation layer 503 and the pixel electrode 560 are formed on the first electrode 550. The pixel electrode 560 corresponds to a second electrode for the storage capacitor.

The pixel electrode 560 for the liquid crystal capacitor is formed on the passivation layer 503. The pixel electrode 560 is electrically connected to the drain electrode 514 through a contact hole 530. The contact hole 530 may be formed by partially removing the passivation layer 503 formed on the drain electrode 514.

The reflective electrode 570 is formed on the pixel electrode 560 as a separate metal layer which may be made of materials including, but not limited to, aluminum-group metals. The reflective electrode 570 corresponds to the first electrode 550 for the storage capacitor. The reflective electrode 570 reflects light that is incident thereonto. The reflective electrode 570 may have substantially the same size as the first electrode 550.

In an exemplary embodiment, each of the gate, source and drain electrodes 511, 513 and 514 may be formed as a single metal layer. In an alternative exemplary embodiment, each of the gate, source and drain electrodes 511, 513 and 514 may be formed as multiple metal layers. The metal layer may be made of materials including, but not limited to, aluminum-group metals such as aluminum (Al) and aluminum alloy, silver-group metals such as silver (Ag) and silver alloy, copper-group metals such as copper (Cu) and copper alloy, molybdenum-group metals such as molybdenum (Mo) and molybdenum alloy, chromium (Cr), tantalum (Ta), titanium (Ti), etc. Although not shown in FIG. 6, gate lines GL correspond to a same metal layer as the gate electrode 511 and the first electrode 550 for the storage capacitor. In addition, data lines DL correspond to a same metal layer as the source and drain electrodes 513 and 514.

The color filter substrate 200 includes a transparent substrate 201. The color filter substrate 200 also includes an intercepting layer 202, a pixel layer 203, a protective layer 204 and a common electrode 205 successively formed on the transparent substrate 201. The intercepting layer 202 intercepts light, and defines a first portion of the pixel region PR in FIG. 5 corresponding to the pixel electrode 560.

The pixel layer 203 includes red, green and blue color filter patterns. Each of the color filter patterns is formed on the first portion defined by the intercepting layer 202. A light hole 210 is formed through the pixel layer 203. In an exemplary embodiment, a portion of the color filter pattern that corresponds to the reflective electrode 570 is removed to form the light hole 210.

Accordingly, light that is incident into the display panel 640 is reflected by the reflective electrode 570 for the storage capacitor to exit the display panel 640 through the light hole 210, so that an optical reflectivity thereof may be enhanced. The light hole 210 may have a size W2' corresponding to about 80% to about 120% of a size W1" of the reflective electrode 570. The size W1" may be substantially same as a size of the first electrode 550.

The protective layer 204 is formed on the intercepting layer 202 and the pixel layer 203 to planarize and protect the intercepting layer 202 and the pixel layer 203. The common electrode 205 may be made of any suitable material that is transparent and conductive. The common electrode 205 to which a common voltage is applied corresponds to a second electrode of the liquid crystal capacitor.

Liquid crystal molecules of the liquid crystal layer 300 are rearrangeable by a voltage difference between a pixel electrode 560 of the array substrate 500 and the common electrode 205 of the color filter substrate 200. When electric fields are applied to the liquid crystal layer 300, an arrangement of liquid crystal molecules of the liquid crystal layer 300 is altered to change optical transmissivity, thereby displaying an image. The liquid crystal layer 300 is comprised of about 90 degrees twisted nematic (TN) liquid crystal. The liquid crystal layer 300 has a cell gap 'd' of $\lambda/2$, where $\lambda$ represents a wavelength of specified achromatic light. In an exemplary embodiment, the $\lambda/2$ is in a range of about 0.35 μm to about 0.45 μm.

Figure 7:
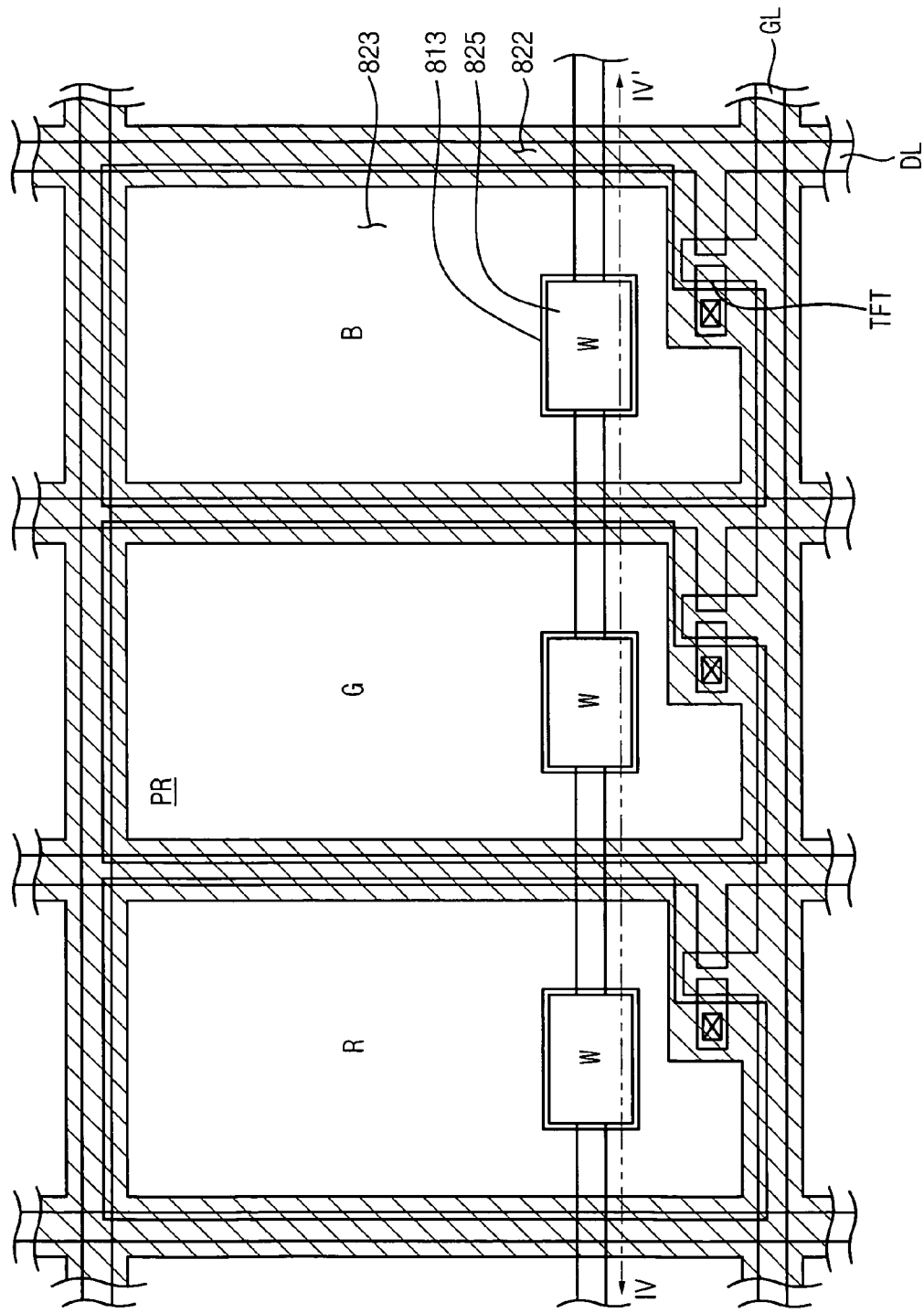
FIG. 7 is a plan view illustrating an exemplary embodiment of a display device in accordance with the present invention.

FIG. 7 is a plan view illustrating an exemplary embodiment of a display device in accordance with the present invention.

Referring to FIG. 7, a display device includes a display panel. The display panel includes an array substrate, a color filter substrate and a liquid crystal layer.

The array substrate includes a plurality of data lines DL, a plurality of gate lines GL, and a plurality of pixel regions PR defined by the gate lines GL and data lines DL. Each of the pixel regions PR includes a switching element TFT, a first electrode for a storage capacitor (not shown), and a reflective electrode 813 corresponding to the first electrode. The reflective electrode 813 corresponds to the first electrode for the storage capacitor formed as a gate metal layer. Alternatively, the reflective electrode 813 may be formed as the source and drain metal layers or a separate metal layer.

The color filter substrate includes an intercepting layer 822 defining a first portion of the pixel region PR and a color filter pattern 823 formed on the first portion. A portion of the color filter pattern 823 that corresponds to the reflective electrode 813 is removed to form a light hole 825.

Figure 8:
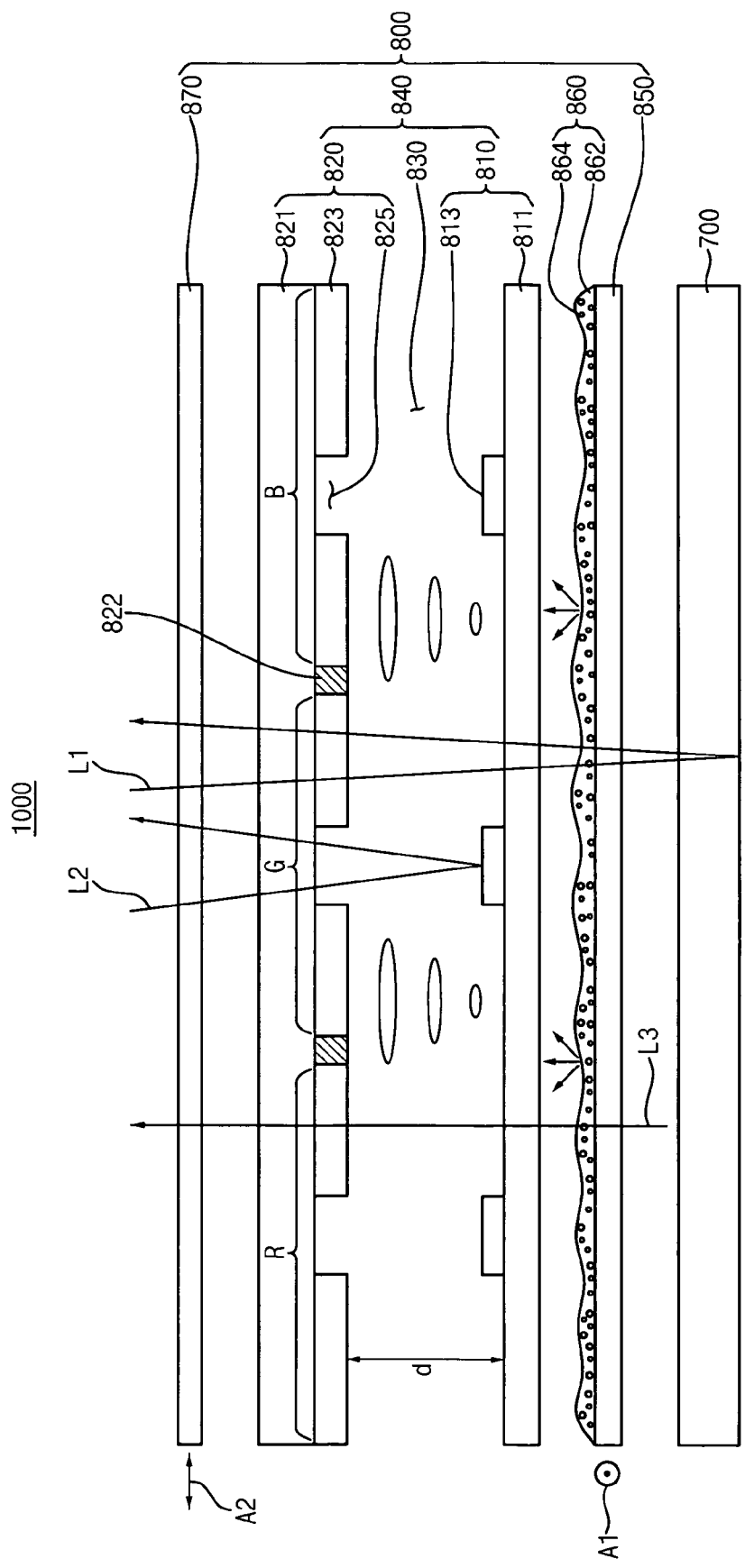
FIG. 8 is a cross-sectional view taken along line IV-IV' in FIG. 7.

FIG. 8 is a cross-sectional view taken along line IV-IV' in FIG. 7.

Referring to FIG. 8, the display device 1000 includes a backlight assembly 700 and a display panel assembly 800.

The backlight assembly 700 includes a light source, a light guiding plate, a reflecting member and an optical member. The light source may include a linear light source and/or a point light source. The light guiding plate guides light emitted from the light source toward the display panel assembly 800. The reflecting member is disposed under the light guiding plate to reflect light passing through the light guiding plate. The reflecting member may include an enhanced specular reflector (ESR). The optical member allows a distribution of the light passing through the light guiding plate to be uniform.

The display panel assembly 800 includes a display panel 840, a lower polarizing film 850, a diffusion layer 860 and an upper polarizing film 870.

The display panel 840 includes a first substrate 810, a second substrate 820 and a liquid crystal layer 830 interposed between the first and second substrates 810 and 820.

The first substrate 810 includes the reflective electrode 813 formed on a transparent substrate 811. The reflective electrode 813 is correspondingly formed to the first electrode for the storage capacitor. In an exemplary embodiment, the reflective electrode 813 is formed as the gate metal layer. Alternatively, the reflective electrode 813 may be formed as the source and drain metal layers, or a separate metal layer. The first electrode may have a size corresponding to about 10% of a size of each pixel region.

The second substrate 820 includes red (R), green (G) and blue (B) color filter patterns (RGB color filter patterns) 823 formed on the color filter substrate 821. A portion of the RGB color filter patterns 823 that corresponds to the reflective electrode 813 may be removed to form a light hole 825.

The liquid crystal layer 830 is comprised of about 90 degrees twisted nematic (TN) liquid crystal. The liquid crystal layer 830 has a cell gap 'd' of $\lambda/2$, where $\lambda$ represents a wavelength of specified achromatic light. In an exemplary embodiment, the $\lambda/2$ is in a range of about 0.35 μm to about 0.45 μm.

The lower polarizing film 850 is disposed under the display panel 840 to partially transmit a first polarized light that is vibrating substantially in parallel with a first polarization axis A1 of incident light having the first polarization axis A1.

The diffusion layer 860 is coated on a surface of the lower polarizing film 850 to diffuse the first polarized light. Particularly, an anti-glare (AG) on the surface of the lower polarizing film 850 may be treated to form the diffusion layer 860. The diffusion layer 860 includes a coated material 862 and a scattering material 864 inserted into the coated material 862. For example, the coated material 862 includes, but is not limited to, an acryl-group resin, and the scattering material 864 includes, but is not limited to, silica particles.

In an exemplary embodiment, the lower polarizing film 850 faces the backlight assembly 700 at one face, and faces the display panel 840 at another face. The diffusion layer 860 includes a synthetic resin having a scattering material 864. The diffusion layer 860 has a haze no less than about 60%.

The upper polarizing film 870 is disposed over the display panel 840 to partially transmit a second polarized light that is vibrating substantially in parallel with a second polarization axis A2 of incident light having the second polarization axis A2. The upper polarizing film 870 may be treated to have a low optical reflectivity, for example, such as anti-reflection static (ARS), anti-reflection coating (ARC), etc.

Accordingly, a first light L1 incident onto the display panel 840 is reflected by a reflecting sheet of the backlight assembly 700, and then the reflected first light L1 is diffused by the diffusion layer 860 to exit the display device 1000. A first optical reflectivity in this case is about 2.8%.

A second light L2 is reflected by the reflective electrode 813 formed on the array substrate 810, and then the reflected second light L2 exits the display device 1000 through the light hole 825. A second optical reflectivity in this case is about 4%. Thus, when the reflective electrode 813 has a size corresponding to about 10% of a size of each pixel region, an optical reflectivity of each pixel region is enhanced by about 6.8%, and a total optical reflectivity of the pixel regions is enhanced by about 148%.

Figure 9A:
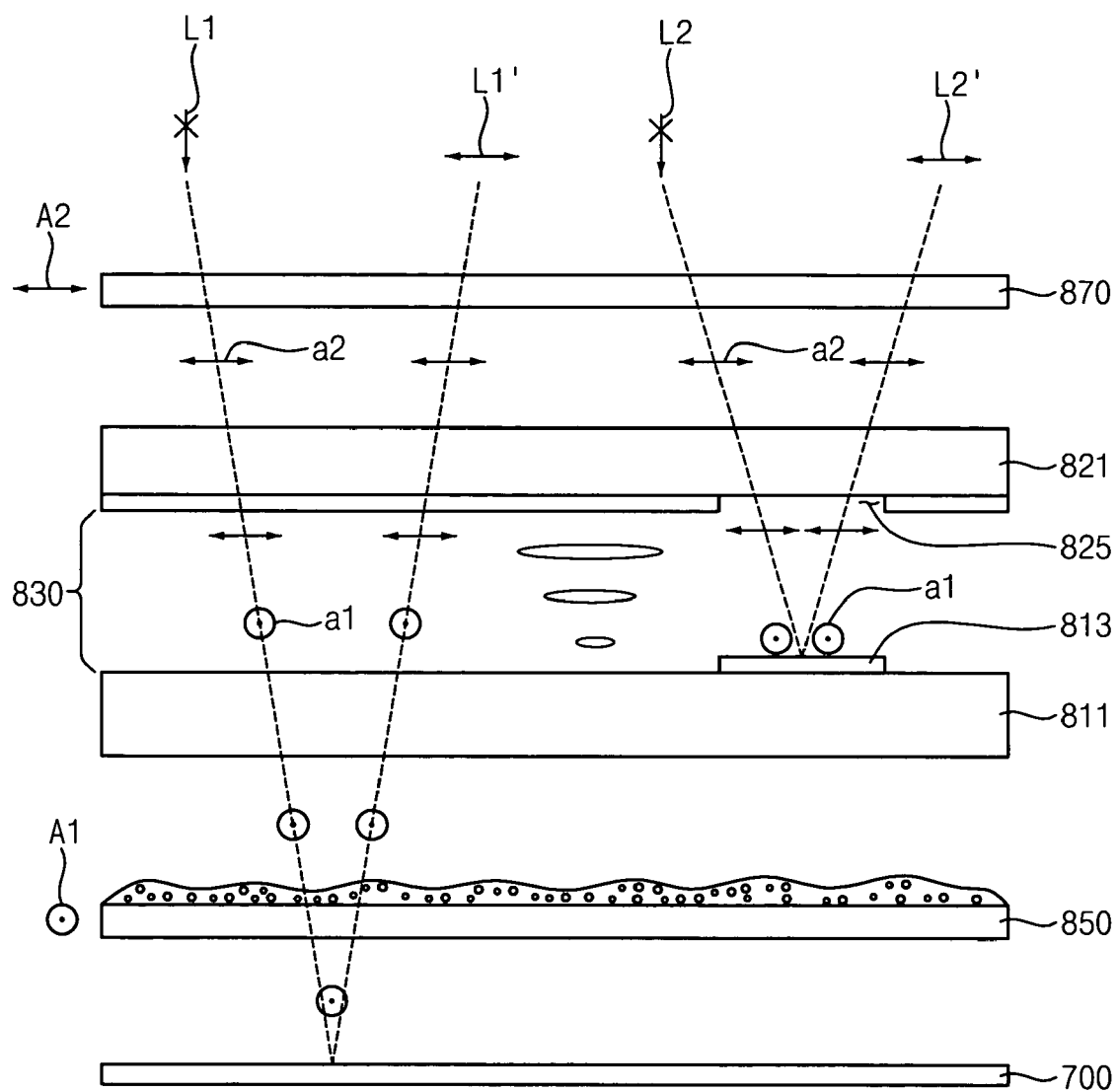
FIG. 9A is a cross-sectional view illustrating a path of a first light and a path of a second light in FIG. 8.

FIG. 9A is a cross-sectional view illustrating a path of a first light and a path of a second light in FIG. 8. In an exemplary embodiment, the liquid crystal layer 830 has a TN mode, a normally black mode, and a power-off state.

Referring to FIG. 9A, the first light L1 becomes a second linearly polarized light a2 through the upper polarizing film 870 having the second polarization axis A2. The second linearly polarized light a2 is polarized in a direction substantially parallel with the second polarization axis A2. The second linearly polarized light a2 becomes a first linearly polarized light a1 through the liquid crystal layer 830 comprised of about 90 degrees twisted nematic (TN) liquid crystal. The first linearly polarized light a1 is polarized in a direction substantially perpendicular to the second polarization axis A2. The first linearly polarized light a1 passes through the transparent substrate 811 and the lower polarizing film 850 successively. The first linearly polarized light a1 passing through the transparent substrate 811 has a light axis substantially parallel with the first polarization axis A1 of the lower polarizing film 850. The first linearly polarized light a1 passing through the lower polarizing film 850 is reflected by a reflecting member (not shown) of the backlight assembly 700. The reflected first linearly polarized light a1 passes through the lower polarizing film 850 to be incident into the transparent substrate 811.

The first linearly polarized light a1 incident into the transparent substrate 811 becomes the second linearly polarized light a2 through the liquid crystal layer 830 comprised of about 90 degrees twisted nematic (TN) liquid crystal. Then, the second linearly polarized light a2 passes through the color filter substrate 821. Thus, the second linearly polarized light a2 passes through the upper polarizing film 870 to exit the display device 1000. The second polarization axis A2 of the upper polarizing film 870 is substantially in parallel with a light axis of the second linearly polarized light a2.

The second light L2 is reflected by the reflective electrode 813 formed on the transparent substrate 811, and then the reflected second light L2 exits the display device through the light hole 825. A second optical reflectivity in this case is about 8%. Thus, when the reflective electrode 813 has a size corresponding to about 20% of a size of each pixel region, an optical reflectivity of each pixel region is enhanced by about 10.8%, and a total optical reflectivity of the pixel regions is enhanced by about 286%.

Figure 9B:
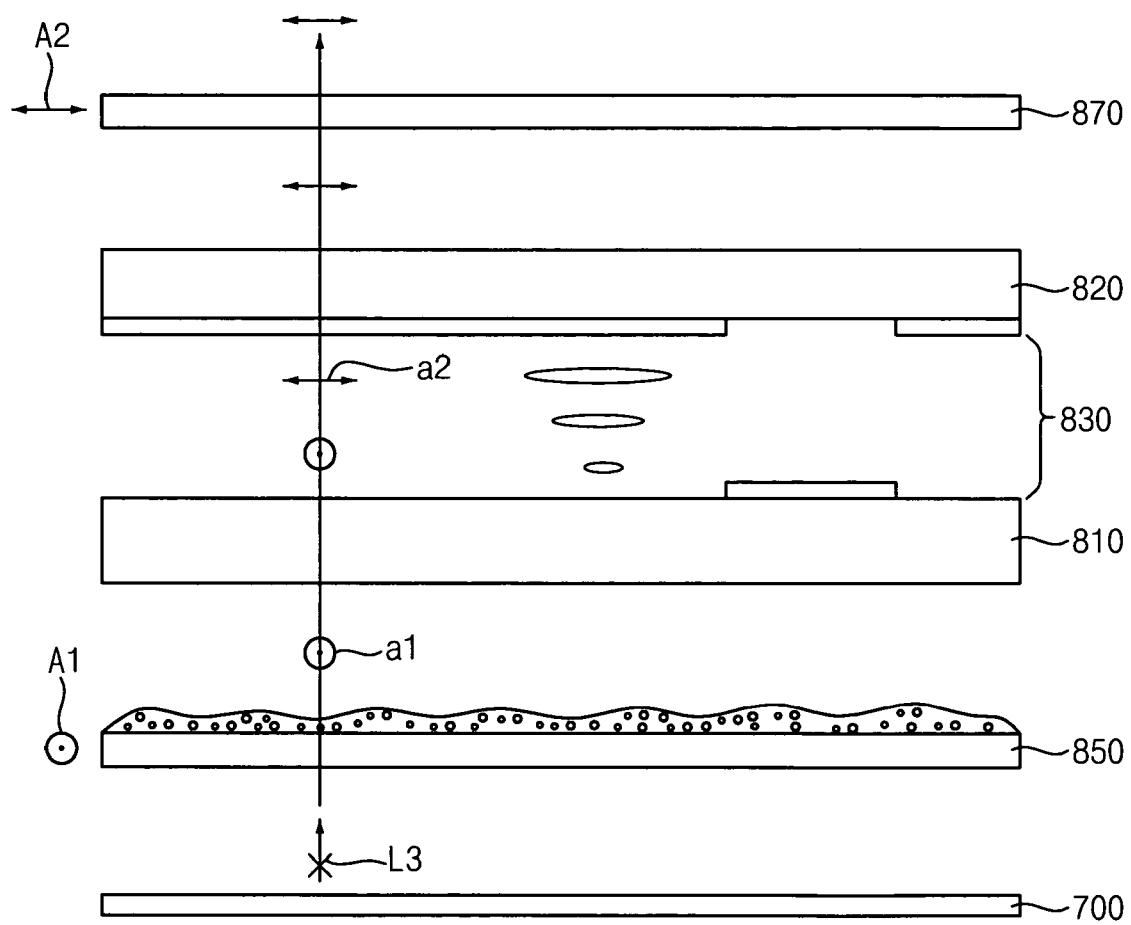
FIG. 9B is a cross-sectional view illustrating a path of a third light in FIG. 8.

FIG. 9B is a cross-sectional view illustrating a path of a third light in FIG. 8. In the present embodiment, the liquid crystal layer 830 has a TN mode, a normally black mode, and a power-off state.

Referring to FIG. 9B, a third light L3 generated from the backlight assembly 700 becomes the first linearly polarized light a1 through the lower polarizing film 850. The first linearly polarized light a1 is polarized in a direction substantially parallel with the first polarization axis A1. The first linearly polarized light a1 passes through the array substrate 810. The first linearly polarized light a1 becomes the second linearly polarized light a2 through the liquid crystal layer 830 comprised of about 90 degrees twisted nematic (TN) liquid crystal. The second linearly polarized light a2 is polarized in a direction substantially perpendicular to the first polarization axis A1. Then, the second linearly polarized light a2 passes through the color filter substrate 820. Thus, the second linearly polarized light a2 passes through the upper polarizing film 870 to exit the display device 1000. The second polarization axis A2 of the upper polarizing film 870 is substantially in parallel with a light axis of the second linearly polarized light a2.

Figure 10:
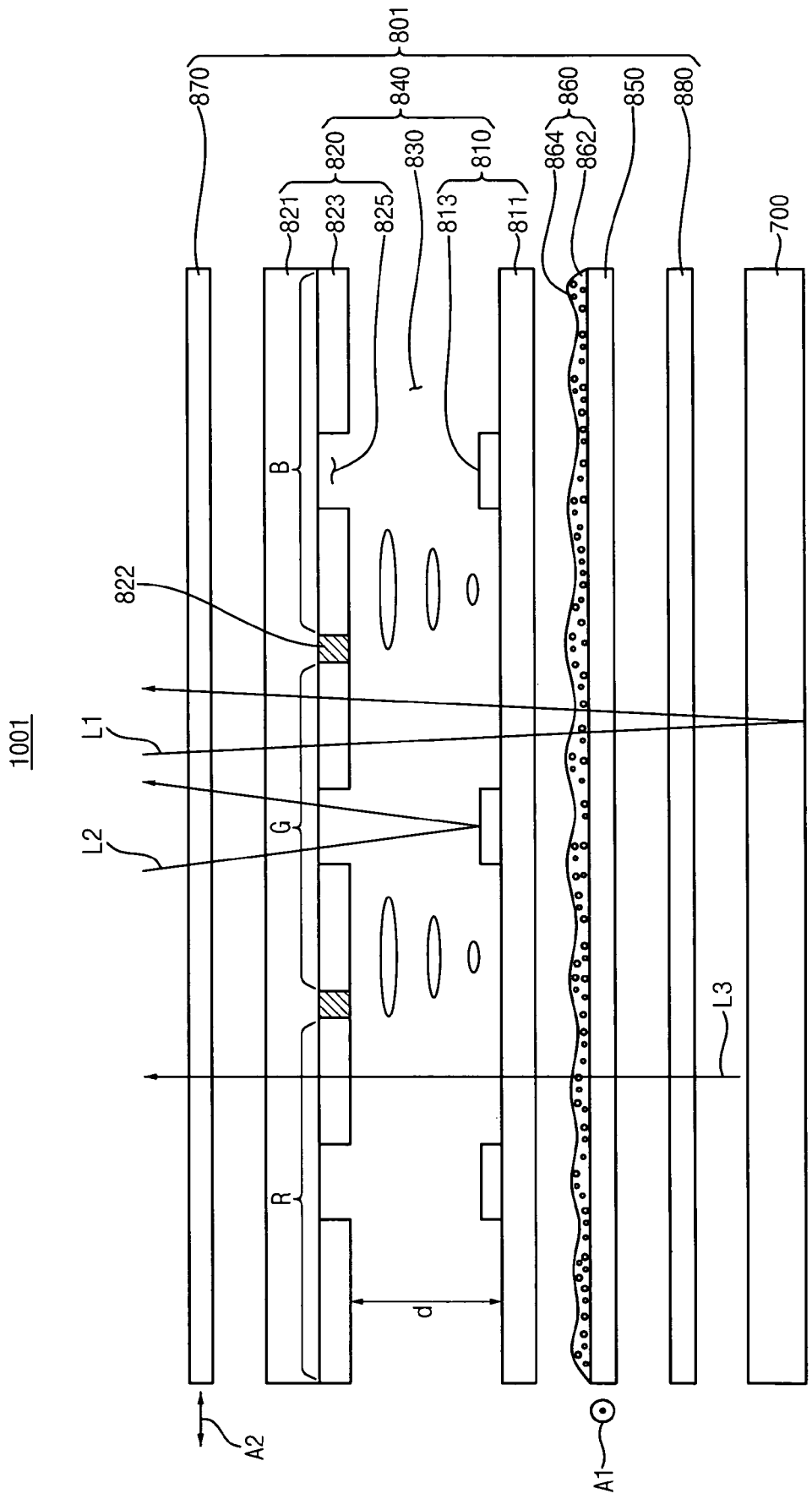
FIG. 10 is a plan view illustrating another exemplary embodiment of a display device in accordance with the present invention.

FIG. 10 is a plan view illustrating another exemplary embodiment of a display device in accordance with the present invention.

Referring to FIG. 10, the display device 1001 includes a backlight assembly 700 and a display panel assembly 801.

The backlight assembly 700 according to the present embodiment is substantially identical to the backlight assembly shown in FIG. 8. Thus, any further description will be omitted.

The display panel assembly 801 includes a display panel 840, a lower polarizing film 850, a diffusion layer 860, an upper polarizing film 870 and a transflective film 880.

The display panel 840 includes a first substrate 810, a second substrate 820 and a liquid crystal layer 830 interposed between the first and second substrates 810 and 820.

The first substrate 810 includes the reflective electrode 813 formed on a transparent substrate 811. The reflective electrode 813 is correspondingly formed to the first electrode for the storage capacitor. In an exemplary embodiment, the reflective electrode 813 is formed as the gate metal layer. Alternatively, the reflective electrode 813 may be formed as the source and drain metal layers, or a separate metal layer. The first electrode has a size corresponding to about 20% of a size of each pixel region PR. The reflective electrode 813 corresponds to the first electrode for the storage capacitor formed as a gate metal layer.

The second substrate 820 includes red (R), green (G) and blue (B) color filter patterns (RGB color filter patterns) 823 formed on the color filter substrate 821. A portion of the RGB color filter patterns 823 that corresponds to the reflective electrode 813 may be removed to form a light hole 825.

The liquid crystal layer 830 is comprised of about 90 degrees twisted nematic (TN) liquid crystal. The liquid crystal layer 830 has a cell gap 'd' of $\lambda/2$, where $\lambda$ represents a wavelength of specified achromatic light. In an exemplary embodiment, the $\lambda/2$ is in a range of about 0.35 µm to about 0.45 µm.

The lower polarizing film 850 is disposed under the display panel 840 to partially transmit a first polarized light that is vibrating substantially in parallel with a first polarization axis A1 of incident light having the first polarization axis A1.

The diffusion layer 860 is coated on a surface of the lower polarizing film 850 to diffuse the first polarized light.

The upper polarizing film 870 is disposed over the display panel 840 to partially transmit a second polarized light that is vibrating substantially in parallel with a second polarization axis A2 of incident light having the second polarization axis A2. The upper polarizing film 870 may be treated to have a low optical reflectivity, for example, such as anti-reflection static (ARS), anti-reflection coating (ARC), etc.

The transflective film 880 may be integrally formed with the lower polarizing film 850. The transflective film 880 has a substantially same transmissive axis as the first polarization axis A1 of the lower polarizing film 850.

The transflective film 880 corresponds to a dual brightness enhancement film (DBEF) having a multiple-layered structure. The DBEF includes thin films having different materials from each other, which are alternately layered in hundreds of layers. In an exemplary embodiment, a poly-ethylene naphthalate layer having a high double-refractive index and a poly-methyl methacrylate (PMMA) layer having an isotropic structure are alternately layered. Polyethylene naphthalate having a flat planar structure may be easily layered, and a refractive index thereof with respect to a layered direction is very different from refractive indexes thereof with respect to non-layered directions. In contrast, PMMA corresponding to amorphous polymer has an isotropic structure, so that PMMA has a uniform refractive index regardless of directions.

For example, when the first and second polarization axes have an angle of about 45 degrees and an angle of about 135 degrees with respect to a predetermined reference axis, respectively, the transmissive axis of the transflective film 880 has an angle of about 45 degrees with respect to the predetermined reference axis.

A first light L1 passes through the upper polarizing film 870 to have a polarized angle of about 135 degrees. Then, the first light L1 has a polarized angle of about 45 degrees after passing through the liquid crystal layer 830. The first light L1 having a polarized angle of about 45 degrees is diffused by the diffusion layer 860. The first light L1 having a polarized angle of about 45 degrees of the diffused first light L1 passes through the lower polarizing film 850 and the transflective film 880 to be reflected by a reflecting member of the backlight assembly 700. The reflecting member, for example, has a sheet shape or a plate shape. The reflected first light L1 passes through the transflective film 880 and the lower polarizing film 850. Then, the first light L1 passes through the liquid crystal layer 830 to have a polarized angle of about 135 degrees, and thus exits the display device through the upper polarizing film 870.

The first light L1 not having a polarized angle of about 45 degrees of the diffused first light L1 is reflected by the transflective film 880 to exit the display device through the display panel 840. Thus, the transflective film 880 may enhance an optical reflectivity. The transflective film 880 may be integrally formed with the lower polarizing film 850.

Accordingly, the first light L1 incident into the display panel 840 is reflected by the reflecting member of the backlight assembly 700, and the reflected first light L1 is diffused by the diffusion layer 860 to exit the display device. A first optical reflectivity in this case is about 2.8%.

The second light L2 is reflected by the reflective electrode 813 formed on the array substrate 810, and then the reflected second light L2 exits the display device through the light hole 825. A second optical reflectivity in this case is about 8%. Thus, when the reflective electrode 813 has a size corresponding to about 20% of a size of each pixel region, an optical reflectivity of each pixel region is enhanced by about 10.8%, and a total optical reflectivity of the pixel regions is enhanced by about 286%.

According to the present invention, a first electrode for a storage capacitor functions as a reflecting body, and a color filter pattern corresponding to the first electrode is removed to form a light hole, thereby improving an optical reflectivity of a display device.

In addition, the first electrode may be replaced with a metal layer such as a source metal layer, a drain metal layer, etc., thereby improving the optical reflectivity of the display device. Thus, a display device having the display panel has an enhanced optical reflectivity, and an improved display quality in a reflective mode.

In detail, when light is incident onto a pixel region, the incident light has a first path and a second path. In the first path, the incident light is partially reflected by a reflecting body of a backlight assembly to exit the display device. In the second path, the incident light is partially reflected by a reflective electrode formed on an array substrate to exit the display device through a light hole of a color filter substrate. Thus, an optical reflectivity is enhanced by an amount of light emitted through the second path in a reflective mode, thereby improving a display quality of the display device. In addition, the display device may have color reproducibility similar to that of a pixel structure comprising of red, green, blue and white pixels.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display panel comprising:
   a liquid crystal layer;
   an array substrate including a plurality of data lines, a plurality of gate lines, a plurality of pixel regions, and an electrode for a storage capacitor being formed on each of the pixel regions; and
   a color filter substrate combined with the array substrate to receive the liquid crystal layer therebetween, the color filter substrate including a first region where a color filter is formed and a second region where an opening is formed, the opening corresponding to the electrode for the storage capacitor.

2. The display panel of claim 1, further comprising:
   a first polarizing film disposed beneath the array substrate to polarize incident light in a first polarized state; and
   a diffusion layer disposed between the array substrate and the first polarizing film to diffuse the incident light.

3. The display panel of claim 2, further comprising a second polarizing film disposed on the color filter substrate to polarize the incident light in a second polarized state.

4. The display panel of claim 2, wherein the diffusion layer includes a synthetic resin having a scattering material.

5. The display panel of claim 2, wherein the diffusion layer has a haze no less than about 60%.

6. The display panel of claim 2, further comprising a transflective film disposed under the first polarizing film to selectively reflect or transmit the incident light.

7. The display panel of claim 6, wherein the transflective film has a substantially same transmission axis as a first polarization axis of the first polarizing film.

8. The display panel of claim 7, wherein the transflective film is integrally formed with the first polarizing film.

9. The display panel of claim 1, wherein the electrode for the storage capacitor has a size corresponding to about 10% to about 20% of a size of each pixel region.

10. The display panel of claim 1, wherein the electrode for the storage capacitor corresponds to a same layer as the data lines.

11. The display panel of claim 1, wherein the array substrate comprises a reflective electrode corresponding to the electrode for the storage capacitor.

12. The display panel of claim 11, wherein the reflective electrode has a substantially same size as the electrode for the storage capacitor.

13. The display panel of claim 11, wherein each of the pixel regions includes a pixel electrode, and the reflective electrode corresponds to a metal pattern formed on the pixel electrode.

14. The display panel of claim 1, wherein the liquid crystal layer has a cell gap of $\lambda/2$, wherein $\lambda$ represents a wavelength of specified achromatic light.

15. The display panel of claim 1, wherein the liquid crystal layer includes a twisted nematic mode.

16. The display panel of claim 1, wherein the opening has a size corresponding to about 80% to about 120% of a size of the electrode for the storage capacitor.

17. A display device comprising:
a liquid crystal display (LCD) panel including a liquid crystal layer, an array substrate including an electrode for a storage capacitor formed thereon to reflect a first light, and a color filter substrate having a light hole formed thereon, the light hole corresponding to the electrode for the storage capacitor; and
a backlight assembly irradiating a second light into the LCD panel, and reflecting the first light to the LCD panel.

18. The display device of claim 17, wherein the array substrate comprises a plurality of data lines, and the electrode for the storage capacitor corresponds to a same metal layer as the data lines.

19. The display device of claim 17, wherein the array substrate comprises a reflective electrode corresponding to the electrode for the storage capacitor and reflecting the first light.

20. The display device of claim 19, wherein the array substrate comprises a pixel electrode, and the reflective electrode is formed on the pixel electrode.

21. The display device of claim 17, further comprising: a first polarizing film disposed beneath the LCD panel to polarize incident light in a first polarized state; a diffusion layer disposed between the LCD panel and the first polarizing film to diffuse the incident light.

22. The display device of claim 21, comprising a second polarizing film disposed on the LCD panel to polarize the incident light in a second polarized state.

23. The display device of claim 22, wherein the diffusion layer includes synthetic resin having a scattering material.

24. The display device of claim 22, wherein the diffusion layer has a haze no less than about 60%.

25. The display device of claim 17, further comprising a transflective film disposed between the backlight assembly and the first polarizing film to selectively reflect or transmit the incident light.

26. The display device of claim 25, wherein the transflective film has a substantially same transmission axis as a first polarization axis of the first polarizing film.

27. The display device of claim 26, wherein the transflective film is integrally formed with the first polarizing film.

* * * * *